United States Patent
Young (10) Patent No.: US 7,028,117 B1
(45) Date of Patent: Apr. 11, 2006

(54) STRUCTURE FOR HANDLING PACKETIZED SCSI PROTOCOL DATA OVERRUNS IN A MULTI-DATA CHANNEL HOST ADAPTER

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 588 days.

(21) Appl. No.: 10/185,875

(22) Filed: Jun. 27, 2002

(51) Int. Cl.
*G06F 13/362* (2006.01)

(52) U.S. Cl. .......................... 710/113; 710/107
(58) Field of Classification Search ............. 710/107, 710/113; 714/712
See application file for complete search history.

(56) References Cited

U.S. PATENT DOCUMENTS 5,655,147 A * 8/1997 Stuber et al. ............... 710/7
5,659,690 A * 8/1997 Stuber et al. ............... 710/307
5,748,806 A * 5/1998 Gates ......................... 710/315
5,838,950 A * 11/1998 Young et al. ............... 710/5

OTHER PUBLICATIONS

Farlex, Inc.; TheFreeDictionary.com entry for "bit bucket"; URL: http://computing-dictionary.thefreedictionary.com/bit%20bucket.*
Barney, James R; In Search of Ordinary Meaning; J. Pat & Trademark Off. Soc'y 101 (2003); pp. 101-130.*

* cited by examiner

*Primary Examiner*—R. Stephen Dildine
(74) *Attorney, Agent, or Firm*—Gunnison, McKay & Hodgson, L.L.P.; Forrest Gunnison (57) ABSTRACT

An overrun data handling circuit in a SCSI initiator automatically handles Packetized SCSI Protocol data overruns. A multi-data channel host adapter includes the overrun data handling circuit that automatically handles data overruns for one data context in a Packetized SCSI Protocol data stream without damaging data for other data contexts, in the data stream, for which a data overrun has not occurred.

15 Claims, 6 Drawing Sheets

STRUCTURE FOR HANDLING PACKETIZED SCSI PROTOCOL DATA OVERRUNS IN A MULTI-DATA CHANNEL HOST ADAPTER

BACKGROUND OF THE INVENTION

1. Field of the Invention

The present invention relates generally to data transfers over an I/O bus, and more particularly, to data overruns during Packetized SCSI data transfers between a SCSI target and a SCSI initiator.

2. Description of Related Art

For a non-packetized SCSI data transfer, a data overrun was defined as a SCSI target device, sometimes called a SCSI target, asserting another request signal REQ during the SCSI bus data phase after the transfer of all the data associated with a scatter/gather list. Typically, an on-chip host adapter processor observed the overrun condition, and generated an interrupt with an overrun error code to a host adapter driver. The host adapter processor was paused until released by the host adapter driver.

In response to the interrupt, the host adapter driver asserted an attention signal on the SCSI bus in an attempt to get the SCSI target to change phase to SCSI bus phase MESSAGE OUT so that the host adapter driver could send an appropriate message, e.g., an abort message to the target. However, the target was stuck in the data phase because the host adapter logic was not configured to assert any more acknowledge signals after the end of the scatter/gather list.

Consequently, the host adapter driver enabled a bit bucket hardware circuit in the host adapter. The bit bucket hardware circuit automatically asserted an acknowledge signal on the SCSI bus for each extra active request signal received from the SCSI target. The acknowledge signals were asserted to enable the target to change the SCSI bus phase. The target could not change the SCSI bus phase when outstanding request signals had not been acknowledged by the host adapter.

No data was transferred between the SCSI target and the host adapter while the bit bucket hardware circuit was active. The bit bucket hardware circuit stopped asserting the acknowledge signal when either the SCSI bus changes phase or a SCSI bus free occurs. The bit bucket hardware circuit either was automatically disabled, or was disabled by the host adapter driver. The host adapter driver performed any necessary clean up in the host adapter, i.e., in the initiator, and then unpaused the host adapter processor.

The above process worked well for the non-packetized SCSI protocol. As is known to those of skill in the art, for the Packetized SCSI protocol, delimiters were introduced that broke the data stream into packets, sometimes called information units. The length of a command, data, or status information unit was specified by a value in a data length (DL) field of a header packet preceding the command, data, or status information unit. When the command, data, or status information unit exceeded the length specified in the DL field of the preceding header packet, this also was an overrun condition. The handling of overruns is further complicated in the Packetized SCSI protocol by the possibility of multiple data contexts in the same data stream.

In the prior art host adapter, once a data overrun was detected for the Packetized SCSI protocol and the bit bucket circuit was enabled by the host adapter driver, each request signal from the SCSI target was automatically responded to with an acknowledge signal generated by the automatic bit bucket circuit. Any bytes associated with the request signal were discarded. No information unit boundaries were recognized and no header packets were decoded.

Consequently, any data context in the data stream that was different from the data context for which the overrun occurred was not recognized, and the data for any other data context in the data stream was discarded. Consequently, the prior art host adapters that used automatic hardware circuitry to generate acknowledge signals when a data overrun occurred were not useful for the Packetized SCSI Protocol.

SUMMARY OF THE INVENTION

According to the one embodiment of the present invention, a multi-data channel SCSI host adapter includes a bit bucket circuit having an enable terminal. The bit bucket circuit automatically generates at least one SCSI acknowledge signal after a signal is asserted on the enable terminal. The SCSI host adapter also includes an overrun data handling circuit. The overrun data handling circuit has a bit bucket enable output line connected to the enable terminal of the bit bucket circuit. After an overrun condition exists, the overrun data handling circuit drives a de-asserted signal on the bit bucket enable output line, after occurrence of a context change, to disable the bit bucket circuit.

After the data overrun is detected, the overrun data handling circuit also drives a de-asserted signal on the bit bucket enable output line after occurrence of either a SCSI bus phase change, or a context done. In each case, independent of whether the host adapter driver has asserted a bit bucket enable signal, the bit bucket circuit is disabled after the occurrence of any one of a context change, a context done, and a SCSI bus phase change.

In one embodiment, the SCSI host adapter further includes a plurality of data channels, and a status block for each data channel in the plurality of data channels. A channel bit bucket disable circuit is connected to the status block for each data channel in the plurality of data channels. The channel bit bucket disable circuit has a plurality of output lines including an output line for each data channel in the plurality of data channels.

A channel selector is connected to the plurality of output lines of the channel bit bucket disable circuit. The channel selector has an output terminal and the channel selector selectively couples and selectively de-couples each output line in the plurality of output lines to the output terminal.

A bit bucket enable controller is connected to the bit bucket enable output line. A host adapter driver bit bucket enable line is connected to the bit bucket enable controller. The bit bucket enable controller automatically selectively connects and selectively disconnects the host adapter driver bit bucket enable line to and from the bit bucket enable output line. A bit bucket control line is connected to the output terminal of the channel selector and to the bit bucket enable controller. After a signal is asserted on the bit bucket control line, the bit bucket enable controller disconnects the host adapter driver bit bucket enable line from the bit bucket enable output line. A context change line also is connected to the bit bucket enable controller. After a signal is asserted on the context change line, the bit bucket enable controller disconnects the host adapter driver bit bucket enable line from the bit bucket enable output line.

In one embodiment, a method for handling Packetized SCSI Protocol data overruns by a SCSI initiator includes:

enabling a bit bucket circuit in the SCSI initiator after detecting a data overrun for a data channel in a plurality of data channels of the SCSI initiator where the bit bucket circuit automatically generates at least one SCSI acknowledge signal after being enabled; and disabling, after the detecting the data overrun, the bit bucket circuit after occurrence of a data context change where when the disabling occurs before the enabling, the enabling is inhibited.

The operation of disabling the bit bucket circuit further includes disabling the bit bucket circuit after occurrence of a SCSI bus free state. The operation of disabling the bit bucket circuit also includes disabling the bit bucket circuit after occurrence of a SCSI bus phase change.

In yet another embodiment, a method for handling Packetized SCSI Protocol data overruns by a SCSI initiator includes:

enabling a bit bucket circuit in the SCSI initiator after detecting a data overrun for a data channel in a plurality of data channels in the SCSI initiator; and disabling, after the detecting of the data overrun, the bit bucket circuit after occurrence of any one of a data context change, a SCSI bus phase change, and a data context done, where when the disabling occurs before the enabling, the enabling is inhibited.

Finally, in one embodiment, a method for handling a data overrun in a Packetized SCSI Protocol data stream monitors for a context change in the Packetized SCSI Protocol data stream after a data overrun is detected for one data context in the Packetized SCSI Protocol data stream. The method handles the data overrun for the one data context without damaging another data context in the Packetized SCSI Protocol data stream.

In yet another embodiment, a SCSI host adapter includes another overrun data handling circuit and a bit bucket enable output line connected to the bit bucket circuit. However, this overrun data handling circuit includes the bit bucket enable controller and a tag logic circuit.

This SCSI host adapter further includes a plurality of data channels, a bus phase change status block, and a context done status block. This SCSI host adapter does not include status blocks for each data channel in the plurality of data channels.

A bit bucket disable circuit is connected to the bus phase change status block and to the context done status block. The bit bucket disable circuit has an output terminal.

The bit bucket enable controller is connected to the bit bucket enable output line. A host adapter driver bit bucket enable line is connected to the bit bucket enable controller. The bit bucket enable controller automatically selectively connects and selectively disconnects the host adapter driver bit bucket enable line to and from the bit bucket enable output line. A bit bucket control line is connected to the output terminal of the bit bucket disable circuit and to the bit bucket enable controller. After a signal is asserted on the bit bucket control line by the bit bucket disable circuit, the bit bucket enable controller disconnects the host adapter driver bit bucket enable line from the bit bucket enable output line. A context change line also is connected to the bit bucket enable controller and to the tag logic circuit. After a signal is asserted on the context change line by the tag logic circuit, the bit bucket enable controller disconnects the host adapter driver bit bucket enable line from the bit bucket enable output line.

BRIEF DESCRIPTION OF THE DRAWINGS

In the drawings and the following Detailed Disclosure, elements with the same reference numeral are the same or similar elements. Also, the first digit of a reference numeral indicates the first drawing in which the element with that reference numeral first appeared.

DETAILED DESCRIPTION

According to one embodiment of this invention, overrun data handling circuits 100A (FIG. 1A) and 100B (FIG. 1B) and an overrun data handling method overcome the limitations of a prior art SCSI host adapter in automatically handling Packetized SCSI Protocol data overruns. In one embodiment, overrun data handling circuit 100A of multi-channel host adapter 150A and overrun data handling circuit 100B of multi-channel host adapter 150B both handle data overruns for one data context in a data stream without damaging data for other data contexts, in the data stream, for which a data overrun has not occurred. Hence, multi-data channel host adapters 150A and 150B can be used with the Packetized SCSI Protocol, where multiple data contexts may be included in a single data stream.

Figure 1A:
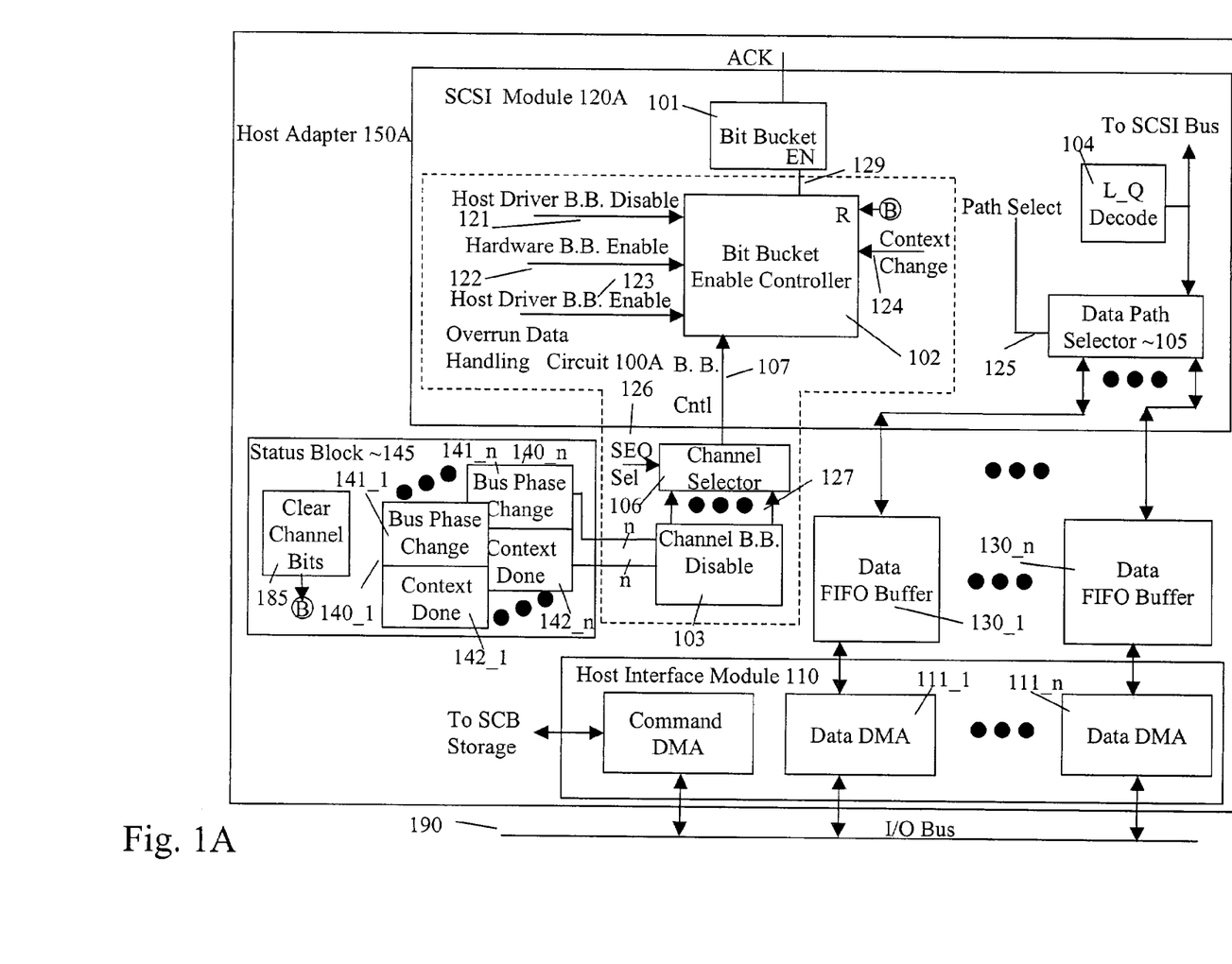
FIG. 1A is a diagram of one embodiment of a host adapter integrated circuit that includes an overrun data handling circuit that handles Packetized SCSI Protocol data overruns without affecting any innocent data context.
Figure 1B:
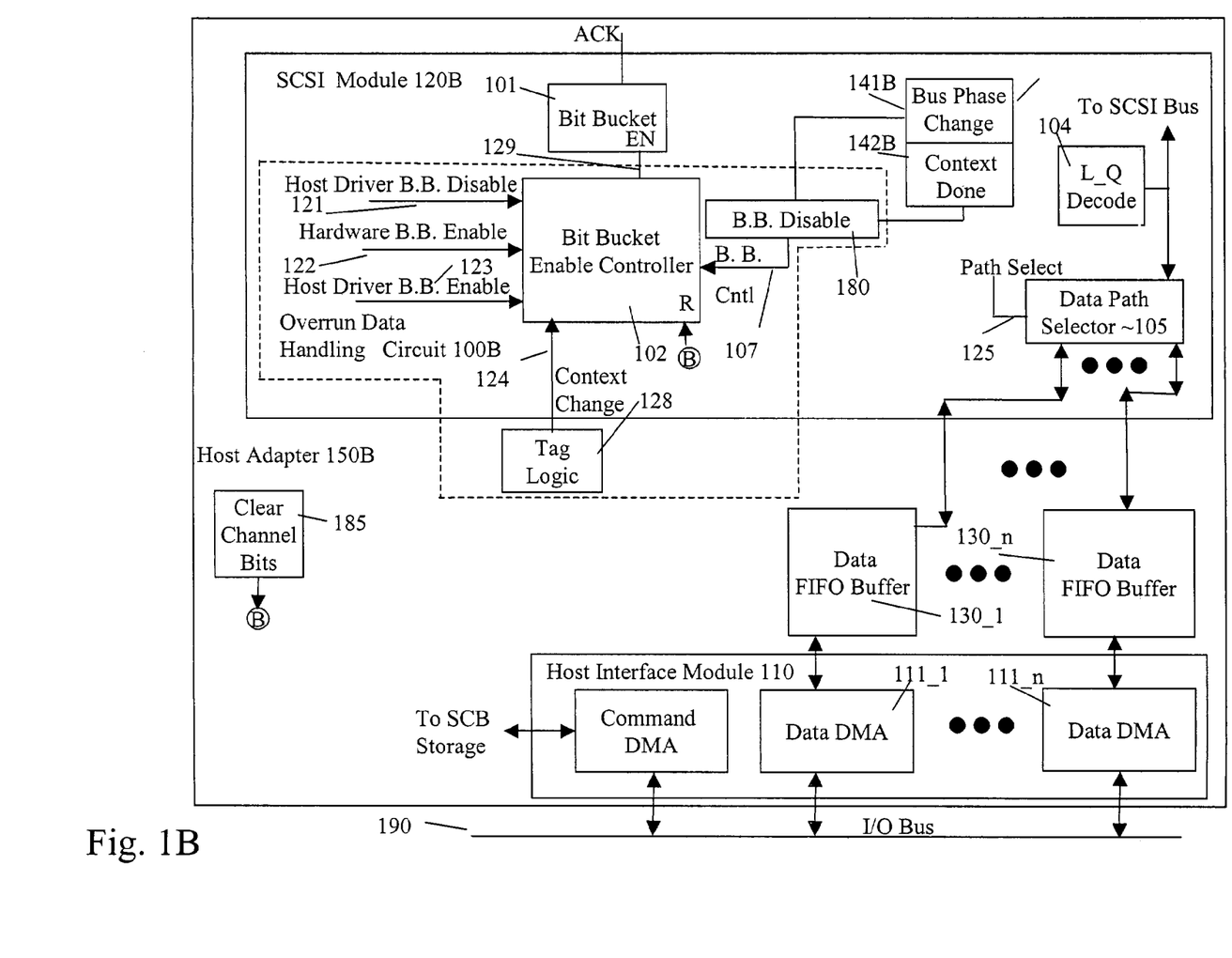
FIG. 1B is a diagram of another embodiment of a host adapter integrated circuit that includes an overrun data handling circuit that handles Packetized SCSI Protocol data overruns without affecting any innocent data context.

In the environment of host adapters 150A and 150B, multiple data contexts exist in the same data stream, as is common in a Packetized SCSI Protocol environment. Data is transferred over the SCSI bus for multiple data contexts without a SCSI bus phase change in some circumstances.

Herein, each data context is associated with a different command to a SCSI target device on the SCSI bus. The Packetized SCSI protocol is well known to those of skill in the art and is described for example in "Information Technology-SCSI Parallel Interface-3 (SPI-3)," T10 Project 1302D, Rev. 13a, American National Standards Institute, New York, N.Y., Jan. 12, 2000, which is incorporated herein by reference as an example of the level of skill in the art.

In the embodiments of FIGS. 1A and 1B, SCSI host adapter 150A includes a SCSI module 120A that interfaces host adapter 150A to the SCSI bus and SCSI host adapter 150B includes a SCSI module 120B that interfaces host adapter 150B to the SCSI bus. Both host adapters 150A and 150B include a host interface module 110 that interfaces host adapters 150A and 150B to another I/O bus 190, sometimes a host I/O bus. Host adapters 150A and 150B also include a plurality of data first-in-first-out (FIFO) buffers 130_to 130_n.

The architectures of host adapters 150A and 150B provide n data paths, sometimes called n data channels, between the SCSI bus and I/O bus 190. The connection to the SCSI bus through SCSI modules 120A and 120B, respectively, is switched between the n data paths using data path selector 105.

Data path selector 105 is connected to each of the plurality of data channels 1 to n. As explained more completely below, data path selector 105 selectively couples and decouples each data channel in the plurality of data channels to the SCSI bus.

Specifically, in response to a predefined signal on a path select line 125, data path selector 105 connects one data FIFO buffer 130_i, where i is the one of 1 to n corresponding to the predefined signal, to the SCSI bus and disconnects all other data FIFO buffers in the plurality of data FIFO buffers from the SCSI bus. Hence, data path selector 105 forms a data path from the SCSI bus to one data FIFO buffer 130_i. Each data FIFO buffer 130_i is coupled to I/O bus 190 by a corresponding data DMA engine 111_i in host interface module 110.

Host adapter 150A includes a status block 145 that in turn includes a channel status block 140_i for each data channel, and so i goes from 1 to n. Each channel status block 140_i includes a bus phase change status block 141_i and a context done status block 142_i.

The on-chip sequencer determines the status of each data channel using a sequencer select signal. Specifically, the on-chip sequencer loads a value in a sequencer select register that in turn generates a sequencer select signal that is used to access channel status block 140_i. To access each of the channel status blocks in turn, the on-chip sequencer loads a value in the sequencer select register, reads the corresponding channel status block, loads a different value in the sequencer select register, and so forth.

Host adapter 150B does not have a detailed status block for each data channel as in host adapter 150A. Host adapter 150B has a single bus phase change status block 141B and a single context done status block 142B. Hence, host adapter 150B does not have, in this embodiment, a sequencer select signal as described for host adapter 150A. Host adapter 150A and host adapter 150B represent different species of a host adapter.

When a data overrun is detected by a host adapter on-chip sequencer (not shown), the on-chip sequencer generates an interrupt to the host adapter driver executing on a host computer (not shown) to advise the host adapter driver of the data overrun. After notifying the host adapter driver of the data overrun, the on-chip sequencer is paused until released by the host adapter driver. Bit bucket enable controller 102, as explained more completely below, controls operation of bit bucket circuit 101 to assure that an innocent data context is not affected by operation of bit bucket circuit 101, e.g., the innocent data context is not bit-bucketed.

One example of an overrun that may be detected by the on-chip sequencer is a scatter/gather list overrun. A scatter/gather list overrun occurs when more data bytes are transferred from or requested by a SCSI target on the SCSI bus than are specified by the scatter/gather list. Either the end of the last data information unit extends beyond the end of the scatter/gather list or another data information unit is received from the target for the same context.

Another overrun possibility is that the SCSI target is in phase DATA OUT, and all the data represented by the scatter/gather list have been transferred and so the data channel is empty. There are no more bytes to be transferred to the SCSI target, and no more acknowledge signals ACKs are generated by host adapters 150A and 150B. However, the SCSI target has generated more request signals REQs and cannot change phase without receiving an acknowledge signal ACK for each additional request signal REQ.

In this embodiment, a signal on bit bucket control line 107 is applied to a first input terminal of a bit bucket enable controller 102 of circuits 100A and 100B. Bit bucket enable controller 102 also receives input signals from (i) a host driver bit bucket disable line 121 that is connected to a second input terminal, (ii) a hardware bit bucket enable line 122 that is connected to a third input terminal, (iii) a host driver bit bucket enable line 123 that is connected to fourth input terminal, and (iv) a context change line 124 that is connected to a fifth input terminal. Lines 121 and 123 are driven in response to signals from host adapter drivers (not shown) for host adapters 150A and 150B, and both of lines 121 and 123 normally carry a de-asserted signal when a data overrun first occurs. Prior to a data overrun, the signals on lines 107 and 124 are de-asserted.

While it is not illustrated in FIGS. 1A and 1B, if on-chip sequencers or other automated hardware in host adapters 150A and 150B detects a condition that can handled using bit bucket circuit 101, the on-chip sequencer or other automated hardware asserts a signal on hardware bit bucket enable line 122 in these situations. The response to the asserted signal on line 122 by bit bucket enable controller 102 is subject to the same interlocks that are described more completely below so that an innocent context cannot be bit bucketed. Typically, however, when a data overrun is detected by the on-chip sequencer of host adapters 150A and 150B, the signals on lines 121 to 124 are de-asserted.

Consequently, after a data overrun has occurred and before there is a SCSI bus phase change, a context done, or a context change, the de-asserted signals on bit bucket control line 107 and context change line 124 do not inhibit operation of bit bucket circuit 101. Bit bucket circuit 101 is equivalent to the bit bucket circuits in the prior art SCSI host adapters and so is known to those of skill in the art. The implementation of bit bucket circuit 101 is not essential to this invention so long as the circuit responds and generates the signals as described herein.

In response to the data overrun interrupt generated by the on-chip sequencer, the host adapter driver automatically asserts a signal on host driver bit bucket enable line 123. When the host adapter driver responds to the data overrun, the host adapter driver does not know whether the overrun context has terminated, e.g., another context has started in the data stream, or whether the SCSI bus has changed phase. The asserted signal on line 123 causes bit bucket enable controller 102 to assert a signal on bit bucket enable output line 129 to an enable terminal EN of bit bucket circuit 101 if and only if the signals on lines 107 and 124 are de-asserted.

After being enabled, bit bucket circuit 101 automatically generates acknowledge signals ACK on the SCSI bus until (i) there is a phase change on the SCSI bus including the SCSI bus entering state BUS FREE, (ii) the current context transfer is completed, or (iii) there is a context change. As explained more completely below, when any one or any combination of a context change, a SCSI bus phase change, or a context done state occurs, the signal on enable terminal EN of bit bucket circuit 101 is de-asserted by bit bucket enable controller 102, i.e., bit bucket circuit 101 is disabled.

While bit bucket circuit 101 is enabled, L_Q decode circuit 104 continues to decode header information units in the data stream to obtain the tag of the context and the number of bytes in the following data information unit. The tag enables determination of a data context change, and the byte count enables the determination of information unit boundaries. L_Q decode circuit 104 is known to those of skill in the art and so is not described further.

However, after a data overrun and enablement of bit bucket circuit 101, all data bytes are discarded until a signal is asserted on one of lines 107, 121, and 124. If a context change occurs prior to the target changing the SCSI bus phase, L_Q decoder 104 detects a header information unit and in response to a new tag in the header information unit, SCSI module 120 asserts a signal on path select line 125 to cause path selector 105 to connect a different data channel j to the SCSI bus where data channel j is any data channel other than data channel i. The new tag and the resulting change in the data channel indicate a context change.

Hence, when a context change occurs, the data path with the overrun condition is disconnected from the SCSI bus, and at the same time, a signal is asserted on context change line 124 to bit bucket enable controller 102. The asserted signal on line 124 causes bit bucket enable controller circuit 102 to de-assert the signal on line 129. Consequently, bit bucket circuit 101 stops operation and so data in the following innocent context is not dropped.

In the above sequence, the context change occurred after the host adapter driver asserted a signal on host driver bit bucket enable line 123. However, it is possible that the context change occurred before the host adapter driver asserted a signal on line 123. In this case, a signal is asserted on context change line 124 before the signal is asserted on line 123 by the host adapter driver.

Whenever the signal on context change line 124 is asserted, bit bucket controller enable controller 102 holds the signal on bit bucket enable output line 129 de-asserted independent of the signal level on host driver bit bucket enable line 123. Hence, after a context change and consequently after a signal has been asserted on context change line 124, bit bucket enable controller circuit 102 holds the signal on line 129 de-asserted independent of whether a signal is asserted by the host adapter driver on line 123. This interlock of events allows a slow host adapter driver to enable bit bucketing after another context has started, and prevents the second innocent context from being bit bucketed by the host adapter driver.

The generation of signals on the input lines to bit bucket enable controller 102 is determined by the species of host adapter in which bit bucket enable controller 102 is implemented, which in turn results in different species of the overrun data handling circuit. One embodiment of each specie is considered more completely below.

Overrun Data Handling Circuit 100A

According to one embodiment of the present invention, overrun data handling circuit 100A (FIG. 1A) includes a channel bit bucket disable circuit 103, a channel selector 106 and bit-bucket enable controller 102. Channel bit bucket disable circuit 103 includes a plurality of data channel bit bucket disable output lines 127, one for each of the n data channels. Each data channel bit bucket disable output line from circuit 103 is connected to a channel selector 106 of circuit 100A. Each of the signals on the plurality of data channel bit bucket disable output lines 127 from circuit 103 is initialized to a first state, e.g., de-asserted.

Channel selector 106 selectively couples and decouples each data channel bit bucket disable output line in plurality of data channel bit bucket disable output lines 127 to and from, respectively, an output terminal of channel selector 106. The output terminal of channel selector 106 is connected to bit bucket control line 107.

In this embodiment, a signal on sequencer select line 126 to channel selector 106 configures channel selector 106 to connect a bit bucket disable output line i to bit bucket control line 107 and to disconnect all other output lines in the plurality of data channel bit bucket disable output lines 127 from bit bucket control line 107.

When a data overrun is detected by host adapter 150A, the host adapter on-chip sequencer (not shown) scans the status information for each data channel in status block 145 using the sequencer select signal to sequentially access a block of status information for each data channel. When the on-chip sequencer determines that a data overrun has occurred for a data channel, e.g., data channel i, the on-chip sequencer generates an interrupt to the host adapter driver executing on a host computer (not shown) to advise the host adapter driver of the data overrun. After notifying the host adapter driver of the data overrun, the on-chip sequencer is paused until released by the host adapter driver.

Data channel i, for which the overrun occurred, is identified by the value stored in the sequencer select register that in turn drives sequencer select line 126. As is known to those of skill in the art, sequencer select line 126 may be a plurality of lines if number of data channels n is greater than two. This assumes the first data channel is designated as data channel 1 as illustrated in FIG. 1, and not data channel 0.

After a data overrun is detected, if a context change does not occur either before or after the host adapter driver asserts a signal on line 123, bit bucketing continues until either the SCSI bus changes phase, which includes a SCSI bus state BUS FREE, or a context done is asserted. When a SCSI bus phase change occurs, hardware in SCSI module 120A automatically configures appropriate information in a bus phase change status block 141_i of channel status block 140_i in status block 145 to indicate that a SCSI bus phase change has occurred. In this example, i is the data channel for which the on-chip sequencer detected a data overrun and can be any one of 1 to n. (Herein, i and i are the same. Character i is used in reference numerals, while character i is used when it appears alone in the text.) Similarly, when a completion of a context occurs, hardware in SCSI module 120 automatically configures appropriate information in a context done status block 142_i of channel status block 140_i in status block 145 to indicate that a context done has occurred.

Figure 2A:
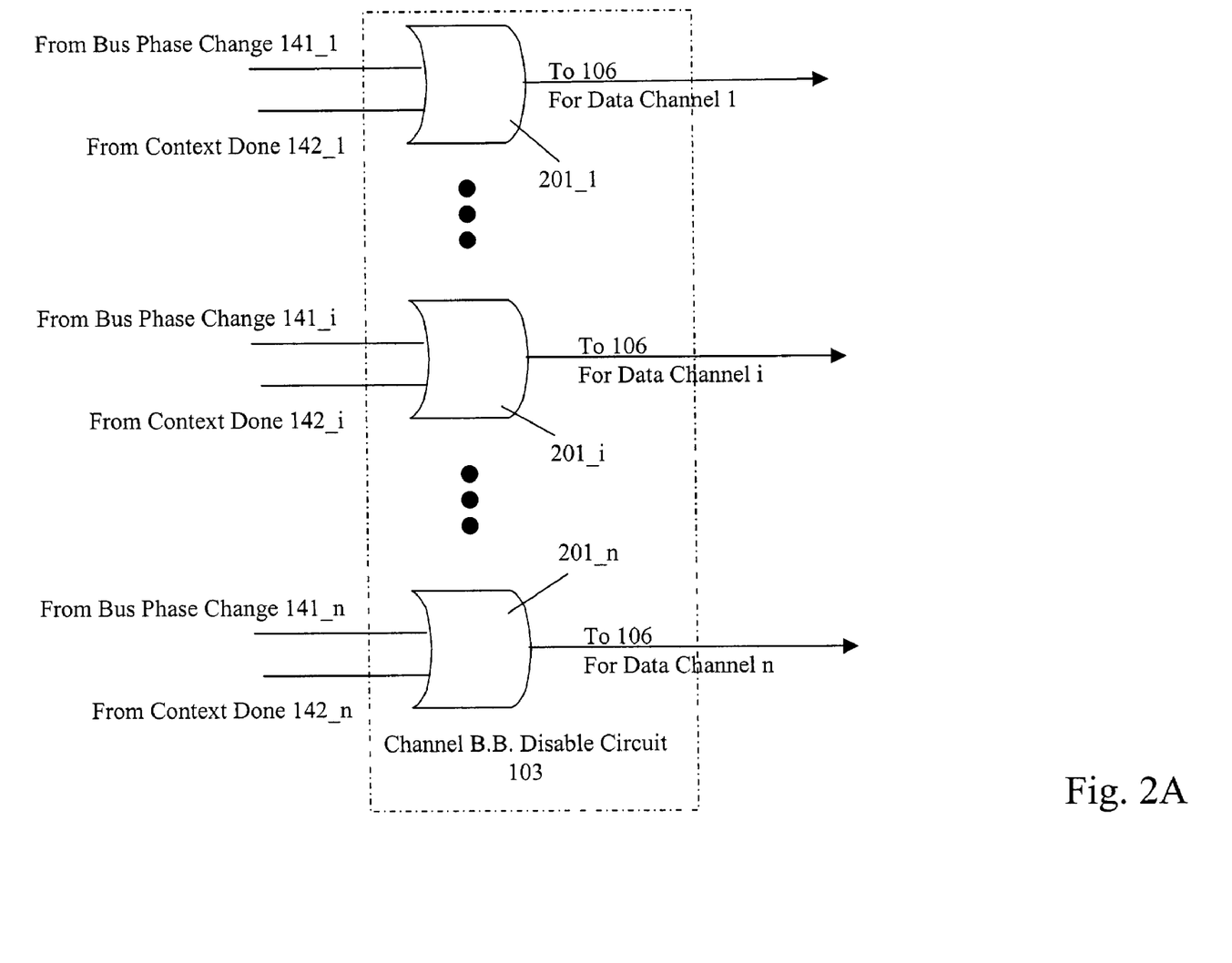
FIG. 2A is a diagram of one embodiment of a channel bit bucket disable circuit in the overrun data handling circuit of FIG. 1A.

Bus phase change status block 141_i is connected to channel bit bucket disable circuit 103, as is context done status block 142_i. FIG. 2A is one embodiment of channel bit bucket disable circuit 103. The line or lines from bus phase change status block 141_i are connected to an input terminal or terminals of an OR gate 201_i. The line or lines from context done status block 142_i also are connected to an input terminal or terminals of OR gate 201_i. The output terminal of OR gate 201_i is connected to output line for data channel i in plurality of data channel bit bucket disable output lines 127 that in turn is connected to an input terminal of channel selector 106 for data channel i.

Hence, when after a data overrun for data channel i either a SCSI bus phase change or a context done occurs for data channel i and is reflected in bus phase change status block 141_i or context done status block 142_i, respectively, in this embodiment a signal is asserted on an input line to channel bit bucket disable circuit 103 for data channel i. In response to this input signal, a signal is asserted on the output line for data channel i to channel selector 106.

Specifically, the sequencer select signal on line 126 to channel selector 106 selects data channel i so that the output line for data channel i of circuit 103 is coupled to line 107.

Hence, in response to the asserted signal on the output line for data channel i from circuit 103, an asserted signal is driven on control line 107.

The asserted signal on line 107 causes bit bucket enable controller circuit 302 to de-assert the signal on line 129. Consequently, bit bucket circuit 101 stops operation.

Whenever the signal on line 107 is asserted, bit bucket controller enable controller 102 holds the signal on bit bucket enable output line 129 de-asserted independent of the signal level on host driver bit bucket enable line 123. Hence, after a data overrun is detected and either or both of a SCSI bus phase change and a context done, bit bucket enable controller circuit 102 holds the signal on line 129 de-asserted independent of whether a signal is asserted by the host adapter driver on line 123. This interlock of events allows a slow host adapter driver to enable bit bucketing after a context is completed or a SCSI bus phase change, and prevents initiation of bit bucketing by the host adapter driver using bit bucket circuit 101.

Thus, bit bucket circuit 101 is disabled by bit bucket enable controller 102 locking out any asserted enable signal on lines 123 and 122 after the occurrence of any one of a context change, a context done, and a SCSI bus phase change. Effectively, enable terminal EN of circuit 101 is disconnected from line 123 and line 122, after the occurrence of any one of a context change, a context done, and a SCSI bus phase change.

When the host adapter driver detects that the bit bucket enable is de-asserted, the host adapter driver notes the SCSI control block for which the data overrun occurred and asserts a clear channel bit in clear channel bits circuit 185. There is one clear channel bit for each of the n data channels. The data path for which the overrun occurred cannot be reallocated to another context until the host adapter driver has asserted the clear channel bit. The asserting of the clear channel bit re-enables bit bucket enable controller 102 so that an asserted signal on either of lines 123 and 122 again can be applied to enable terminal EN of bit bucket circuit 101.

Figure 2B:
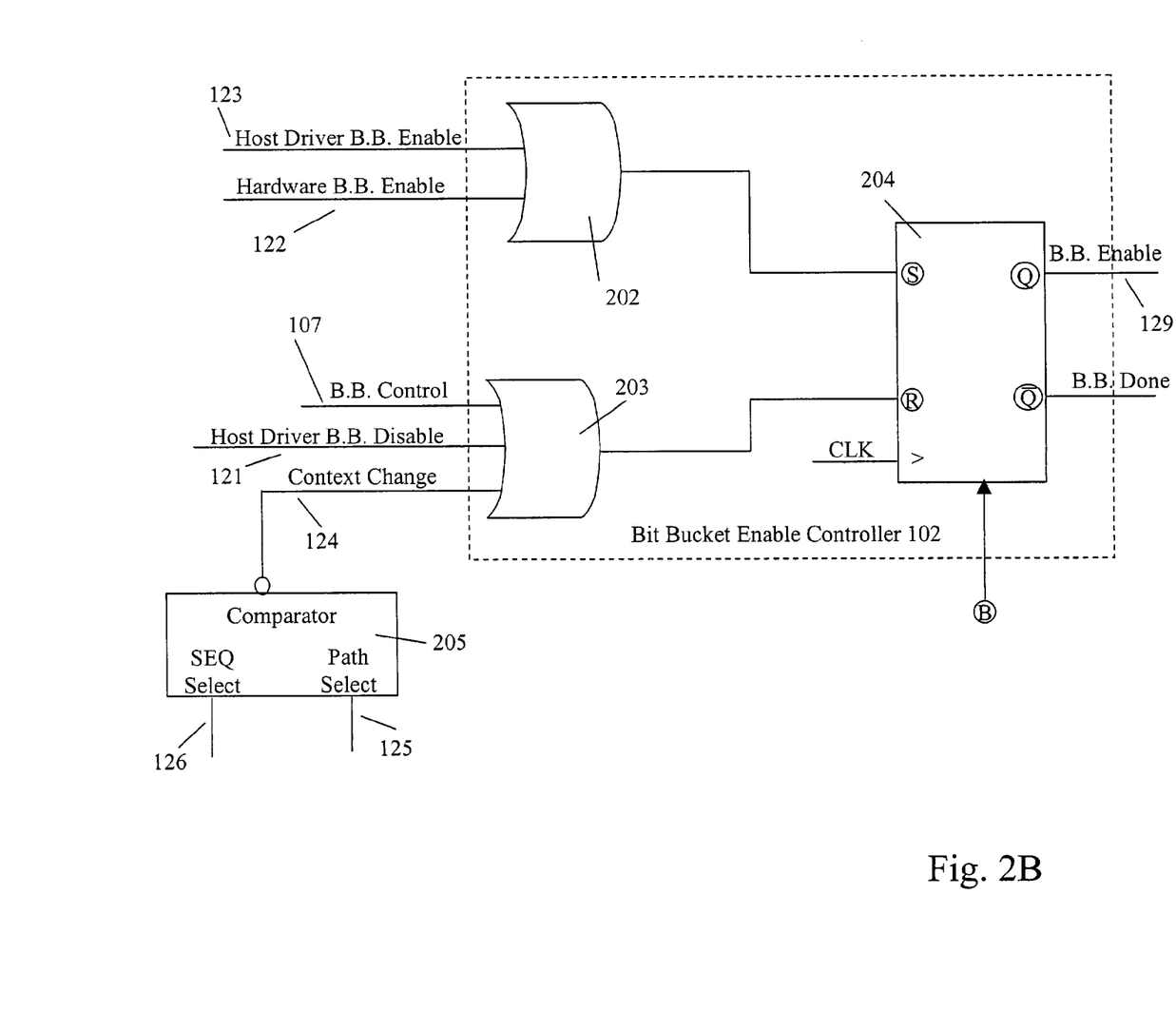
FIG. 2B is a diagram of one embodiment of a bit bucket enable controller and hardware to detect a context change in the overrun data handling circuit of FIG. 1A.

In view of this disclosure, data handling overrun circuit 100A can be implemented in a wide variety of ways. FIG. 2B is an example of one more detailed embodiment of bit bucket enable circuit 102.

Host driver bit bucket enable line 123 is connected to a first input terminal of a first OR gate 202. Hardware bit bucket enable line 122 is connected to a second input terminal of OR gate 202. An output terminal of OR gate 202 is connected to a set terminal S of register 204.

Bit bucket control line 107 is connected to a first input terminal of a second OR gate 203. Host driver bit bucket disable line 121 is connected to a second input terminal of OR gate 203. Context change line 124 is connected to a third input terminal of OR gate 203. An output terminal of OR gate 203 is connected to a reset terminal R of register 204.

An output terminal Q of register 204 is connected to bit bucket enable output line 129. An output terminal /Q of register 204 is connected to a bit bucket done line. When a signal is asserted on terminal R of register 204 from OR gate 203, register 204 is effectively held in reset. Consequently, an asserted signal on terminal S from OR gate 202 cannot assert a signal on bit bucket enable output line 129 when any one of the input signals to OR gate 203 is asserted.

In this embodiment, the occurrence of a context change is detected using a comparator 205. Comparator 205 asserts a signal when the two input signals are the same. Hence, in response to the asserted signal, an inverter on an output terminal of comparator 205 that is connected to context change line 124 drives a de-asserted signal on line 124 when the two input signals are equal.

Sequencer select line 126 is connected to a first input terminal of comparator 205. Path select line 125 is connected to a second input terminal of comparator 205.

As explained above, after occurrence of an overrun, data channel i is selected by the signals on sequencer select line 126 and path select line 125. Consequently, initially, the signal on line 124 is de-asserted.

However, anytime after the overrun but before the overrun is cleared, if L_Q decode circuit 104 detects a new context, SCSI module 120A changes the signal on path select line 125 to data channel j, as described above. Consequently, the signals on lines 125 and 126 are no longer equal, and so a signal is asserted on line 124.

The host adapter driver monitors the signal level on the bit bucket done line. After the overrun, when the signal on bit bucket done line is asserted, the host adapter driver releases the data channel that experienced the overrun by setting the appropriate bit in clear channel bits circuit 185.

FIG. 2B is one example of a bit bucket enable controller 102 that automatically selectively connects and selectively disconnects host adapter driver bit bucket enable line 123 to and from bit bucket enable output line 129. When the signals on lines 107, 121 and 124 are all de-asserted, an asserted signal on line 123 results in an asserted signal on line 129 so that line 123 is effectively connected to line 129. However, when a signal is asserted on any one of lines 107, 121 and 124, and a signal is asserted on line 123, a de-asserted signal is driven on line 129. Thus, line 123 is effectively disconnected from line 129.

Overrun Data Handling Circuit 100B

According to another embodiment of the present invention, overrun data handling circuit 100B includes a bit bucket disable circuit 180, a tag logic circuit 128, and bit bucket enable controller 102. An output terminal of bit bucket disable circuit 180 is connected to bit bucket control line 107. A first input terminal of bit bucket disable circuit 180 is connected to bus phase change status block 141B. A second input terminal of bit bucket disable circuit 180 is connected to context done status block 142B.

When a data overrun is detected by host adapter 150B, the on-chip sequencer generates an interrupt to the host adapter driver executing on a host computer (not shown) to advise the host adapter driver of the data overrun. After notifying the host adapter driver of the data overrun, the on-chip sequencer is paused until released by the host adapter driver.

Again, after a data overrun is detected, if a context change does not occur either before or after the host adapter driver asserts a signal on line 123, bit bucketing continues until either the SCSI bus changes phase, which includes a SCSI bus state BUS FREE, or a context done is asserted. When a SCSI bus phase change occurs, hardware in SCSI module 120B automatically configures appropriate information in bus phase change status block 141B to indicate that a SCSI bus phase change has occurred. Similarly, when a completion of a context occurs, hardware in SCSI module 120B automatically configures appropriate information in context done status block 142B to indicate that a context done has occurred.

Figure 3A:
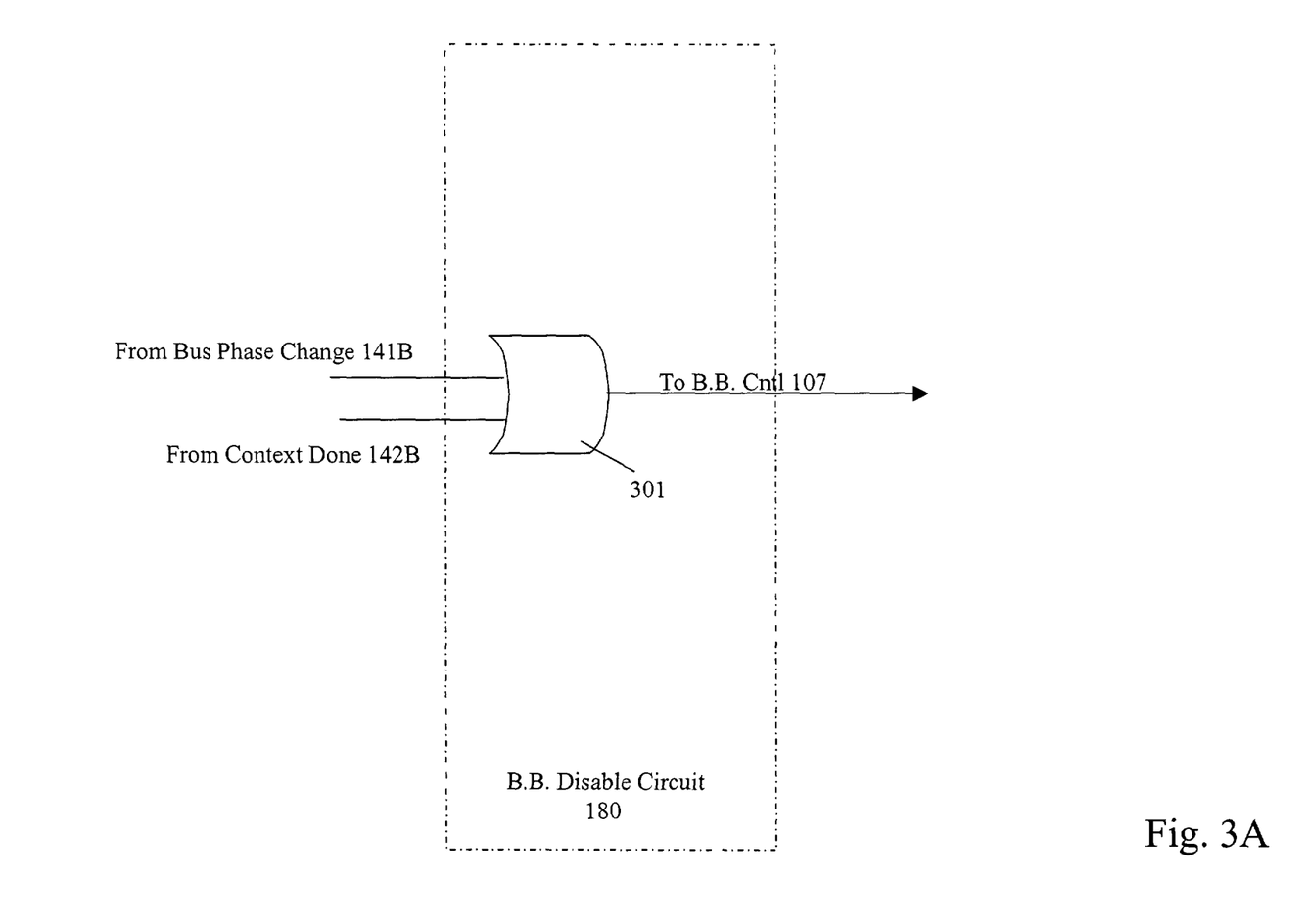
FIG. 3A is a diagram of one embodiment of a bit bucket disable circuit in the overrun data handling circuit of FIG. 1B.

FIG. 3A is one embodiment of bit bucket disable circuit 180. The line or lines from bus phase change status block 141B are connected to an input terminal or terminals of an OR gate 301. The line or lines from context done status block 142B also are connected to an input terminal or terminals of OR gate 301. The output terminal of OR gate 301 is connected to bit bucket control line 107. Hence, in response to an asserted signal from either bus phase change status block 141B or context done status block 142B, an asserted signal is driven on control line 107.

The asserted signal on line 107 causes bit bucket enable controller circuit 102 to de-assert the signal on line 129. Consequently, bit bucket circuit 101 stops operation.

As described above, whenever the signal on line 107 is asserted, bit bucket controller enable controller 102 holds the signal on bit bucket enable output line 129 de-asserted independent of the signal level on host driver bit bucket enable line 123. Hence, after a data overrun is detected and either or both of a SCSI bus phase change and a context done occur, in response to the asserted signal from OR gate 301, bit bucket enable controller circuit 102 holds the signal on line 129 de-asserted independent of whether a signal is asserted by the host adapter driver on line 123. This interlock of events allows a slow host adapter driver to enable bit bucketing after a context is completed or after a SCSI bus phase change, and prevents initiation of bit bucketing by the host adapter driver using bit bucket circuit 101.

Thus, bit bucket circuit 101 is disabled by bit bucket enable controller 102 locking out any asserted enable signal on lines 123 and 122 after the occurrence of any one of a context change, a context done, and a SCSI bus phase change. Effectively, enable terminal EN of circuit 101 is disconnected from line 123 and from line 122, after the occurrence of any one of a context change, a context done, and a SCSI bus phase change.

When the host adapter driver detects that the bit bucket enable signal is de-asserted, the host adapter driver notes the SCSI control block for which the data overrun occurred and asserts a clear channel bit in clear channel bits circuit 185. There is one clear channel bit for each of the n data channels. The data path for which the overrun occurred cannot be reallocated to another context until the host adapter driver has asserted the clear channel bit. The asserting of the clear channel bit re-enables bit bucket enable controller 102 so that an asserted signal on either of lines 123 and 122 again can be applied to enable terminal EN of bit bucket circuit 101.

Figure 3B:
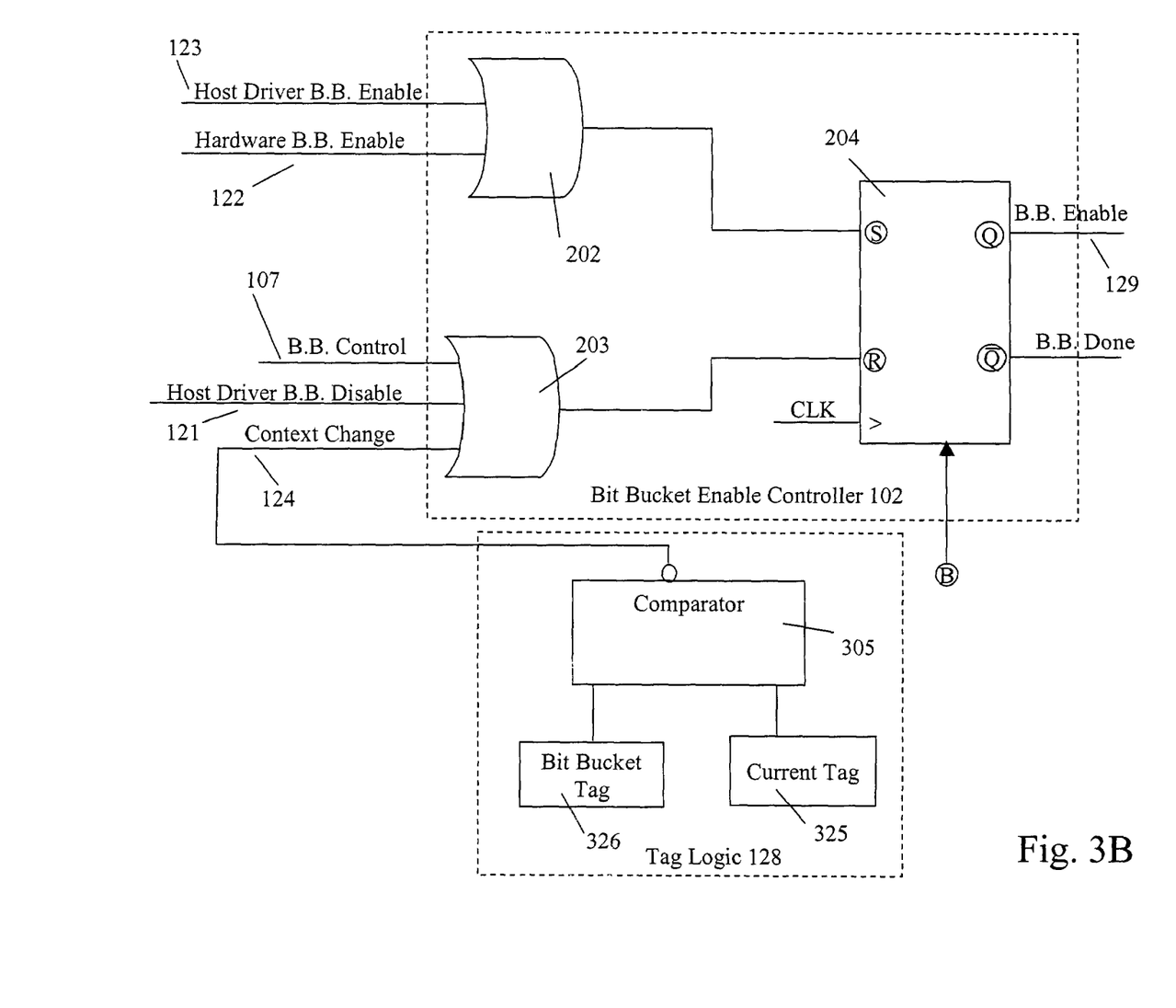
FIG. 3B is a diagram of one embodiment of a bit bucket enable controller and a tag logic circuit that detects a context change in the overrun data handling circuit of FIG. 1B.

In view of this disclosure, data handling overrun circuit 100B can be implemented in a wide variety of ways. FIG. 3B is an example of one more detailed embodiment of bit bucket enable controller circuit 102, which was described above and that description is incorporated herein by reference.

In this embodiment, the occurrence of a context change is detected by tag logic circuit 128. In the embodiment of FIG. 3B, tag logic circuit 128 uses a comparator 305. A value of a bit bucket tag register 326 is a first input to comparator 305. A value of a current tag register 325 is a second input to comparator 305. Initially, bit bucket tag register 326 is loaded with an invalid tag. In response to the invalid tag, comparator 305 is configured to drive an asserted signal on an output terminal that is connected to an inverter that in turn drives a de-asserted signal on context change line 124 during normal operation.

When a data overrun occurs, the current tag is copied to bit bucket tag register 326 so that register 326 contains the tag at the time of the data overrun. The tag in register 326 can be copied into register 326 by automated hardware, the on-chip sequencer, or the host adapter driver. The important aspect is to save a record of the active tag when the data overrun occurred in register 326.

A current tag register 325 contains a tag for the active data context and is loaded in this embodiment, by L_Q decode circuit 104. When the data overrun has been detected, and the current tag copied to register 326, both of registers 325 and 326 contain the same value.

Comparator 305 asserts a signal when the two input values are the same. In response to the asserted signal, the inverter on the output terminal of comparator 305 continues to drive a de-asserted signal on context change line 124.

However, anytime after the overrun but before the overrun is cleared, if L_Q decode circuit 104 detects a new context, SCSI module 120B loads the new tag into register 325. Consequently, the values in registers 325 and 326 are no longer equal, and so a signal is asserted on line 124 to indicate a context change. As described above, in response to the asserted signal on line 124, bit bucket enable controller 102 de-asserts the signal on line 129 so that bit bucket circuit 101 is disabled. Consequently, the new context is not bit-bucketed.

In view of this disclosure, various alternative embodiments of the bit bucket controller, channel selector, channel bit bucket disable circuit, and bit bucket disable circuit can be implemented by those of skill in the art. Consequently, those of skill in the art can implement an overrun data handling circuit with any SCSI host adapter of interest. Therefore, the embodiments described herein are illustrative only and are not intended to limit the invention to the specific embodiments described.

This application is related to commonly assigned and commonly filed U.S. patent application Ser. No. 10/186,102, entitled "A METHOD AND STRUCTURE FOR HANDLING PACKETIZED SCSI PROTOCOL DATA OVERRUNS IN A MULTI-DATA CHANNEL HOST ADAPTER" of B. Arlen Young, which is incorporated herein by reference in its entirety.

I claim:

1. A SCSI host adapter comprising:
   a bit bucket circuit including an enable terminal wherein said bit bucket circuit automatically generates at least one SCSI acknowledge signal after a signal is asserted on said enable terminal; and
   an overrun data handling circuit comprising:
      a bit bucket enable output line connected to said enable terminal; and
      a tag logic circuit wherein after an overrun condition exists, said overrun data handling circuit drives a de-asserted signal on said bit bucket enable output line, after detection of a context change by said tag logic circuit, to disable said bit bucket circuit.

2. The SCSI host adapter of claim 1 further comprising:
   a plurality of data channels; and
   a status block.

3. The SCSI host adapter of claim 2 wherein said data overrun data handling circuit further comprises:
   a bit bucket disable circuit connected to said status block and having an output terminal.

4. The SCSI host adapter of claim 3 wherein said data overrun data handling circuit further comprises:
   a bit bucket control line connected to said output terminal of said bit bucket disable circuit.

5. The SCSI host adapter of claim 4 wherein said data overrun data handling circuit further comprises:
   a bit bucket enable controller connected to said bit bucket control line and to said bit bucket enable output line.

6. The SCSI host adapter of claim 5 wherein said data overrun data handling circuit further comprises:
   a host adapter driver bit bucket enable line connected to said bit bucket enable controller wherein said bit bucket enable controller automatically selectively connects and selectively disconnects said host adapter driver bit bucket enable line to and from said bit bucket enable output line.

7. The SCSI host adapter of claim 6 wherein said data overrun data handling circuit further comprises:
   a context change line connected between said tag logic circuit and said bit bucket enable controller wherein after a signal is asserted on said context change line by said tag logic circuit, said bit bucket enable controller drives said de-asserted signal on said bit bucket enable output line of said data overrun data handling circuit independent of a signal level on said host adapter driver bit bucket enable line.

8. The SCSI host adapter of claim 7 wherein said tag logic circuit further comprises:
   a bit bucket tag register coupled to said output terminal of said tag logic circuit.

9. The SCSI host adapter of claim 7 wherein said tag logic circuit further comprises:
   a current tag register coupled to said output terminal of said tag logic circuit.

10. The SCSI host adapter of claim 8 wherein said tag logic circuit further comprises:
    a current tag register coupled to said output terminal of said tag logic circuit.

11. A SCSI host adapter comprising:
    a bit bucket circuit including an enable terminal wherein said bit bucket circuit automatically generates at least one SCSI acknowledge signal after a signal is asserted on said enable terminal;
    a plurality of data channels;
    a bus phase change status block;
    a context done status block;
    an overrun data handling circuit comprising:
       a bit bucket enable output line connected to said enable terminal;
       a bit bucket disable circuit connected to said bus phase change status block and to said context done status block, and having an output terminal;
       a bit bucket enable controller connected to said bit bucket enable output line;
       a host adapter driver bit bucket enable line connected to said bit bucket enable controller wherein said bit bucket enable controller automatically selectively connects and selectively disconnects said host adapter driver bit bucket enable line to and from said bit bucket enable output line;
       a bit bucket control line connected to said output terminal of said bit bucket disable circuit and to said bit bucket enable controller wherein after a signal is asserted on said bit bucket control line, said bit bucket enable controller disconnects said host adapter driver bit bucket enable line from said bit bucket enable output line; and
       a context change line connected to said bit bucket enable controller wherein after a signal is asserted on said context change line, said bit bucket enable controller disconnects said host adapter driver bit bucket enable line from said bit bucket enable output line.

12. The SCSI host adapter of claim 11 further comprising:
    a tag logic circuit having an output terminal connected to said context change line.

13. The SCSI host adapter of claim 12 wherein said tag logic circuit further comprises:
    a bit bucket tag register coupled to said output terminal of said tag logic circuit.

14. The SCSI host adapter of claim 12 wherein said tag logic circuit further comprises:
    a current tag register coupled to said output terminal of said tag logic circuit.

15. The SCSI host adapter of claim 13 wherein said tag logic circuit further comprises:
    a current tag register coupled to said output terminal of said tag logic circuit.

* * * * *